United States Patent
Kok-Duson (10) Patent No.: US 11,445,703 B2
(45) Date of Patent: Sep. 20, 2022

(54) PROTECTIVE HEAD COVER FOR ANIMALS

(71) Applicant: M.P.S. Holding B.V., Zoetermeer (NL)

(72) Inventor: Nicole Antoinette Kok-Duson, Zoetermeer (NL)

(73) Assignee: M.P.S. Holdings B.V, Zoetermeer (NL)

(*) Notice: Subject to any disclaimer, the term of this patent is extended or adjusted under 35 U.S.C. 154(b) by 147 days.

(21) Appl. No.: 16/378,592

(22) Filed: Apr. 9, 2019

(65) Prior Publication Data
US 2019/0313606 A1    Oct. 17, 2019

(30) Foreign Application Priority Data

Apr. 11, 2018  (NL) ...................... 2020751

(51) Int. Cl.
*A01K 13/00*    (2006.01)

(52) U.S. Cl.
CPC ................. *A01K 13/006* (2013.01)

(58) Field of Classification Search
CPC .. A61D 9/00; A42B 1/008; A42B 1/06; A42B 1/08; A01K 27/001; A01K 27/002; A01K 25/00; A01K 13/006; A41D 3/02; A41D 2200/20; A41B 1/04; A41B 1/006; B68C 5/00
See application file for complete search history.

(56) References Cited

U.S. PATENT DOCUMENTS

| | | | | |
|---|---|---|---|---|
| 275,654 A * | 4/1883 | Hise | ......................... | B68B 1/04 |
| | | | | 54/80.1 |
| 4,593,417 A * | 6/1986 | Brown, Jr. | ............. | A42B 1/045 |
| | | | | 2/205 |
| 4,726,174 A * | 2/1988 | Wilson | .................... | A62B 18/06 |
| | | | | 128/207.11 |
| 5,406,340 A * | 4/1995 | Hoff | ........................ | A61F 9/027 |
| | | | | 2/452 |
| 5,732,415 A * | 3/1998 | Boyd | ........................ | A61D 9/00 |
| | | | | 2/426 |
| 6,311,645 B1 * | 11/2001 | Brown | ................... | A01K 15/02 |
| | | | | 119/712 |
| 6,502,532 B2 * | 1/2003 | Sjolin | ....................... | A61D 9/00 |
| | | | | 128/866 |

(Continued)

FOREIGN PATENT DOCUMENTS

| | | | |
|---|---|---|---|
| CA | 2085257 A1 * | 6/1994 | |
| CN | 104904613 A * | 9/2015 | |

(Continued)

*Primary Examiner* — Magdalena Topolski
(74) *Attorney, Agent, or Firm* — N.V. Nederlandsch Octrooibueau (57) ABSTRACT

A protective head cover for an animal has a first cover portion adjustably fastenable around the neck of the animal and a second closed curvilinear cover portion with a tangential edge which attaches to the first cover portion, and tapering outward sections on either side of the tangential edge. A first fastener part is located on the first cover portion and near the tangential edge of the second cover portion. The first fastener part being can be attached to a second fastener part on the second cover portion. The first and the second fastener parts can be adjustably fastened to each other so as to vary an amount of overlap between the first and the second cover portions.

13 Claims, 5 Drawing Sheets

(56) References Cited

U.S. PATENT DOCUMENTS

| | | | | |
|---|---|---|---|---|
| 6,571,745 B2* | 6/2003 | Kerrigan | ............... | A01K 13/006 119/792 |
| 6,574,948 B2* | 6/2003 | Longtin | ............... | A01K 13/008 54/79.2 |
| 6,678,896 B2* | 1/2004 | Robinson | ................. | A42C 5/04 2/171.2 |
| 7,946,256 B2* | 5/2011 | Mann | .................... | A01K 13/006 119/850 |
| 8,181,609 B2* | 5/2012 | Ohashi | ................. | A01K 13/006 119/815 |
| 8,807,090 B1* | 8/2014 | Potts | ......................... | B68C 1/20 119/850 |
| 9,717,217 B1* | 8/2017 | Blaber | ................. | A01K 13/006 |
| 9,737,051 B2* | 8/2017 | Weber | ................. | A01K 13/006 |
| 9,931,190 B2* | 4/2018 | Haught | ................. | A01K 13/006 |
| 2003/0177984 A1* | 9/2003 | Newman | ................. | A01K 15/027 119/850 |
| 2010/0192871 A1* | 8/2010 | Winestock | ............... | A61D 9/00 119/855 |
| 2010/0206247 A1* | 8/2010 | Cheng | ................. | A01K 13/006 119/850 |
| 2011/0297107 A1* | 12/2011 | Kostelec | .............. | A01K 13/006 119/850 |
| 2014/0007324 A1* | 1/2014 | Svehaug | ................... | A42B 1/08 2/412 |
| 2014/0215695 A1* | 8/2014 | Cleva | ....................... | A42B 3/12 2/411 |
| 2015/0052661 A1* | 2/2015 | Poznick | ................. | A41D 23/00 2/202 |
| 2016/0360727 A1 | 12/2016 | Weber | | |
| 2018/0160651 A1* | 6/2018 | Holt | .................... | A01K 27/008 |
| 2019/0374323 A1* | 12/2019 | McKay | ................... | A61F 11/00 |

FOREIGN PATENT DOCUMENTS

| | | | | |
|---|---|---|---|---|
| DE | 202006009954 | | 10/2006 | |
| DE | 202013101951 U1 | * | 12/2013 | ........... A01K 13/006 |
| GB | 2350544 A | * | 12/2000 | ........... A01K 13/006 |
| KR | 200328590 Y1 | * | 9/2003 | |
| WO | WO-2014078937 A1 | * | 5/2014 | ........... A01K 13/006 |

* cited by examiner

PROTECTIVE HEAD COVER FOR ANIMALS

FIELD OF THE INVENTION

The present invention relates to a protective head cover for animals, preferably, dogs.

BACKGROUND ART

A dog's head, in particular, its ear, is prone to injuries and infections. Dogs are often subject to ear bites as a result of dog fights. Ear and head injuries may also occur as the dog, when kept confined in a kennel, hits its head on the metal bars. In a limited number of countries, dog species like the Dobermann and the Black Great Dane undergo cosmetic otoplasty, or the so-called "ear-cropping", for example, in order to taper their ears to achieve the characteristic pointed ears.

Further, it is not uncommon that dogs contract infections from animals like insects and ticks, or plant varieties like cheat-grass, as they roam around in the open. Although most wounds heal over time, dogs tend to flap their ears sufficiently often to make the healing process much slower than medically required.

Therefore, it is beneficial to both pet owners and the animals themselves, to make use of a device like a protective head cover which prevents extensive movement of ears, once a surgery has been performed on the animal's ears, or medical treatment to the area near its ears has been administered. Such a device may even be used as additional padding to keep a surgical or medical plaster in place on or near the head of the animal.

Such protective head covers are available in certain forms and shapes, however suffer from one or more disadvantages. For example, the typically used "Elizabethan collar" is not only uncomfortable, but may also cause confusion to the animal as its vision is blocked by the large diameter of the cone. Furthermore, the cone cannot prevent a dog from flapping its ears. Other head covers are tubular shaped, like a head muff which can be worn over the head.

Dogs vary greatly in sizes, for example, from <2 meters for a Yorkshire terrier, to >9 meters in case of an Irish Wolfhound. The necks of these animals, however, are not directly proportional to their sizes. For example, a relatively small dog may have exceptionally long neck.

A snug fit of any such suitable device around the dog's neck is highly crucial, which is why many available products provide adjustment of the width of the head cover. However, equally important is the length of the head cover, and the fit around the face. Should a head cover, like a muff, extend too long towards the shoulder of the animal, it is prone to developing injuries from persistent abrasions of its neck against the product. On the other hand, if the cover extends to the front, it may block the animal's vision, causing panic.

In order to accommodate the different neck lengths, manufacturers often provide head covers in sizes ranging across a number of sizes. In other cases, pet owners are required to provide beforehand, precise measurements of the animal's collar and neck, to custom manufacture such a head cover. This can not only be manually tedious, but also results in an expensive end product. In yet other cases, length adjustments may be provided, but to minimal proportions, and using cumbersome mechanisms.

Problems to be Solved

Thus, there exists a need in art to provide an improved protective head cover which allows for length adjustment in a simple manner. One also requires a product whose length adjustment ensures correct fit to animals across a larger variation of neck or head sizes, and thus enables using the same product among different pets. This could consequently cut manufacturing as well as end costs. Such a product may be used for head and/or ear protection of an animal for any of the above mentioned purposes, or simply to protect the head and neck region from unfavorable weather conditions.

The present invention is directed to overcome at least one of the above disadvantages. Other advantages of the invention will become more apparent in the detailed description of the technical features.

SUMMARY OF THE INVENTION

According to a first aspect of the invention, a protective head cover for an animal is provided. The protective head cover comprises a first rectangular cover portion which is adjustably fastenable around the neck of the animal and a second closed curvilinear cover portion. The second cover portion is adjustably fastenable and is adapted to cover at least the occiput and ears of the animal. It comprises a tangential edge or section which attaches to the first cover portion, and tapering outward sections, which are, for example, curved, on either side of the tangential section. The head cover further comprises a first fastener part located on the first cover portion and near the tangential edge of the second cover portion, in a manner such that it can be attached to a second fastener part which is positioned on the second cover portion. Further, the first and the second fastener parts are located on an axis perpendicular to the tangential edge of the second cover portion. When the second fastener part is moved in a direction away from the tangential edge of the second cover portion, towards the first cover portion, at least an area of the second cover portion overlaps an area of the first cover portion. In other words, the first and the second fastener parts can be adjustably fastened to each other so as to vary an amount of overlap between the first and the second cover portions.

In an exemplary embodiment according to the invention, the first and the second fastener parts are located on an outer part of the protective head cover.

In an exemplary embodiment according to the invention, when the second fastener part is moved in a direction away from the tangential section of the second cover portion towards the first cover portion, a size of the protective head cover decreases in a direction perpendicular to the tangential section of the second cover portion.

In an exemplary embodiment according to the invention, the protective head cover further comprises a third fastener part on an inner part of the first cover portion, which is adjustably fastenable to the second fastener part on the second cover portion.

In an exemplary embodiment according to the invention, the first, the second and the third fastener parts are hook and pile.

In an exemplary embodiment according to the invention, the first and the second cover portions comprise both hook and pile, and button fasteners. The second cover portion further comprises a plurality of extensions which extend radially outward from the first axis, or the axis perpendicular to the tangential edge of the second cover portion.

In an exemplary embodiment according to the invention, an inner part of the second cover portion comprises a plurality of pockets on or parallel to the axis perpendicular to the tangential edge of the second cover portion. These plurality of pockets are adapted to seat resilient plates and allow the plates to be inserted or removed, as required.

In an exemplary embodiment according to the invention, the inner part of the second cover portion further comprises a plurality of cavities. The plurality of cavities are located on opposite sides of the first axis which is perpendicular to the tangential edge of the second cover portion. When the head cover is worn by the animal, these cavities would be positioned at or near its ears.

In an exemplary embodiment according to the invention, each cavity comprises a plurality of openings, wherein a first opening which is larger than a second opening. Further, each opening is adapted to receive padding, for example, a cushion, or other inlay, preferably, inserted through the larger opening.

In an exemplary embodiment according to the invention, each of the plurality of cavities is further adapted to receive the ear of the animal via the first opening and allow it to extend via the second opening.

In an exemplary embodiment according to the invention, each cavity comprises hook and pile fasteners. The fasteners are adapted to position or align the padding inside each cavity, such that they are seated properly within the space inside the cavity.

In an exemplary embodiment according to the invention, each cavity is further adapted to receive thermal padding, which can be heated or cooled.

In an exemplary embodiment according to the invention, at least those fasteners of the head cover which are in contact with the animal are made of soft material.

In an exemplary embodiment according to the invention, the second cover portion further comprises a flexible member disposed along a circumference of the second cover potion and sandwiched between the inner part and the outer part of the second cover portion.

In an exemplary embodiment according to the invention, the inner parts of the first and the second cover portions face or are positioned in a direction towards at least a surface near the head when worn by the animal.

DESCRIPTION OF EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope of the claimed invention. In particular, combinations of specific features of various aspects of the invention may be made. An aspect or embodiment of the invention may be further advantageously enhanced by adding a feature that was described in relation to another aspect or embodiment of the invention.

Further, the functionality associated with any particular means may be centralized or distributed, whether locally or remotely. It may be advantageous to set forth that the terms "include" and "comprise," as well as derivatives thereof, mean inclusion without limitation. In addition, reference to an element by the indefinite article "a" or "an" does not exclude the possibility that more than one of the element is present, unless the context clearly requires that there be one and only one of the elements. The indefinite article "a" or "an" thus usually means "at least one".

A first cover portion is understood as a portion which can be or is suitable for surrounding or being wrapped around a neck of the animal. Terms such as collar portion or neck portion are encompassed in the scope of the feature. A second cover portion may be a portion which surrounds or can be wrapped at least around the occiput and ears of the animal, for example, like a bandage. Terms such as head portion or ear portion are synonymous.

The first cover portion is preferably rectangular, however, encompasses acceptable deviations from a perfect rectangular shape. Similarly, the second cover portion may be closed curvilinear in shape, such that a tangent can be approximated with respect to the curve. Examples of such shapes are a circle, ellipse, etc. It is preferred that the tapering outward sections on either side of a tangential section of the second cover portion be curved, in order to ensure maximum overlap with the first cover portion and maximise ear protection. The tangential section of the second cover portion as defined in the claims may comprise an area near the perimeter or boundary of the second cover portion. In an embodiment, the tapering outward sections on either side of the tangential section of the second cover portion may be straight. Such straight sections are easier to manufacture than the curved sections.

A first, second and a third fastener part defined in the claimed invention may comprise hook and pile or hook and loop or touch fasteners. For example, a first fastener part on the first cover portion may be a pile portion, which attaches on to a second fastener part of the second cover portion, the second fastener part being a corresponding hook portion, or vice-versa. A third fastener part may be used in conjunction with the second fastener part, and further comprise a hook and pile assembly. Commercially available Velcro, preferably, a soft type, may be employed, however it is not limiting to the invention. Other fasteners like hook and eye, buttons, zippers, magnetic snaps or press studs may alternatively be employed as fastening mechanisms.

An outer or top part of the protective head cover or the cover portions may be understood as a part which points away from the body of the animal, or, which may minimally contact its body, or, at least, significantly less than the corresponding inner or bottom part. The inner and outer parts of the head cover are located on planar surfaces opposite to each other, and provide a covering or shield to at least a region near the head of the animal, above its dorsal plane. A region near the head of the animal may comprise parts like ears, occiput, neck and throat. Thus, when the head cover is worn by the animal, the inner part faces towards the animal, while the outer part faces away.

An extension which extends radially outward from an axis perpendicular to the tangential section of the second cover portion may be understood as extending either substantially parallel to the longitudinal axis of the first cover portion, or any other radial direction as long as the latter provides a suitable wrap or surround of the extension and/or the second cover portion around the ears and occiput of the animal. The term "perpendicular" encompasses tolerances with respect to measurements.

In the present context, the resilience of a plate implies its ability to return to the initial shape in a manner sufficient to avoid shape distortions of the head cover due to the force from the animal, for example, from pawing or scratching. Plates are synonymous to bars, strips or the like.

Pockets may be attached to the head cover via common techniques like sewing or stitching. They may be made of elastic textile or polyethylene material which is bendable in a manner to allow easy insertion and removal of the plates.

Figure 1:
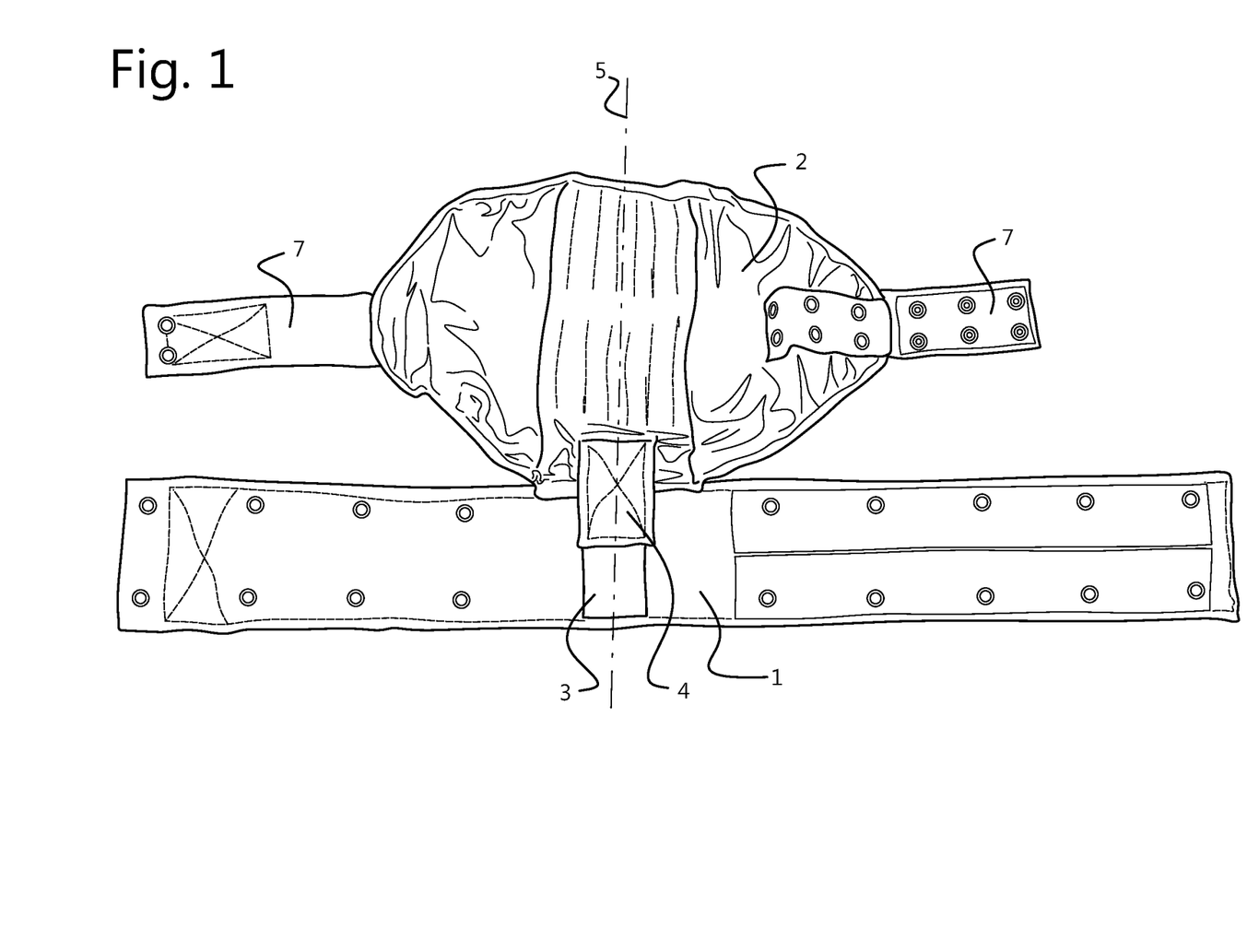
FIG. 1 is a top view of the protective head cover, according to one exemplary embodiment of the invention.
Figure 2:
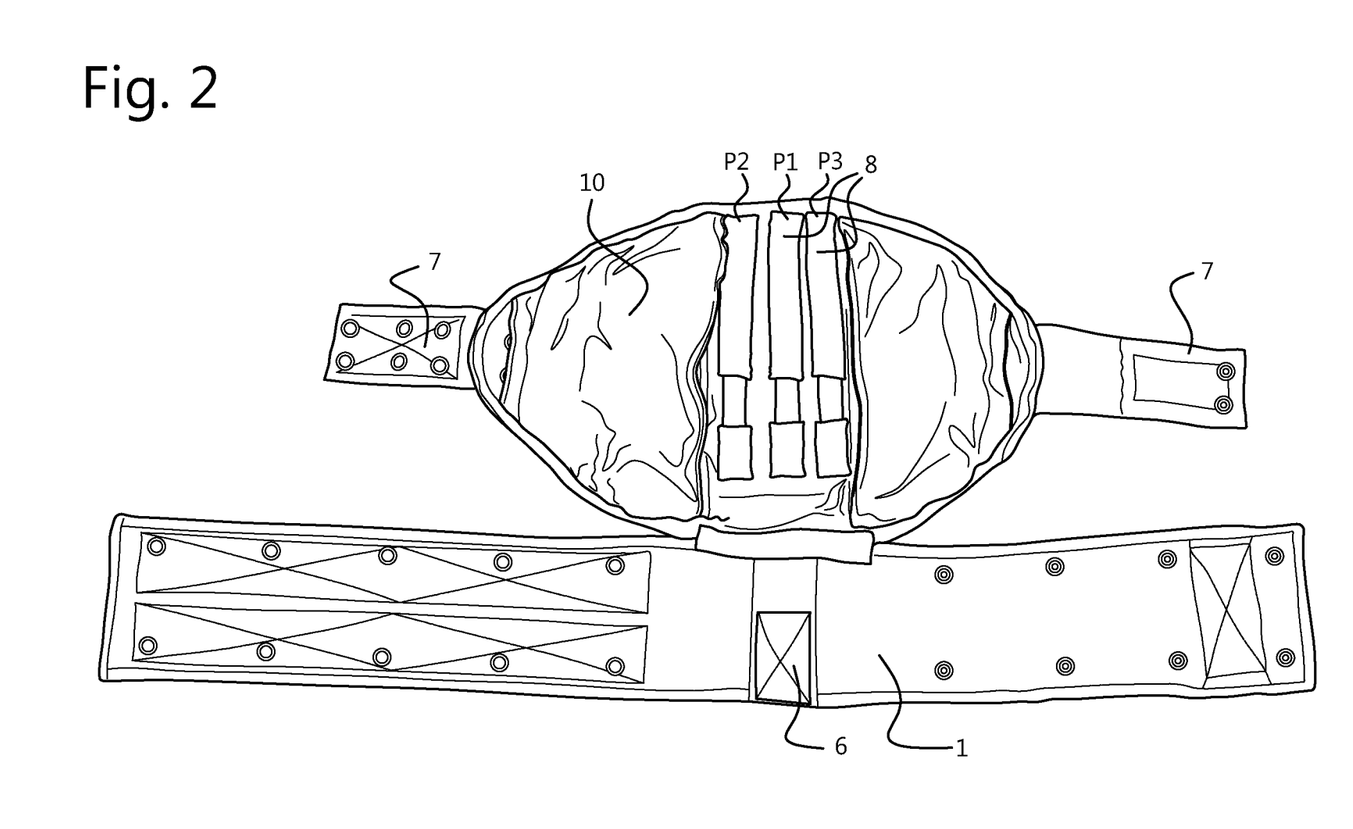
FIG. 2 is a bottom view of the protective head cover, according to one exemplary embodiment of the invention.
Figure 3A:
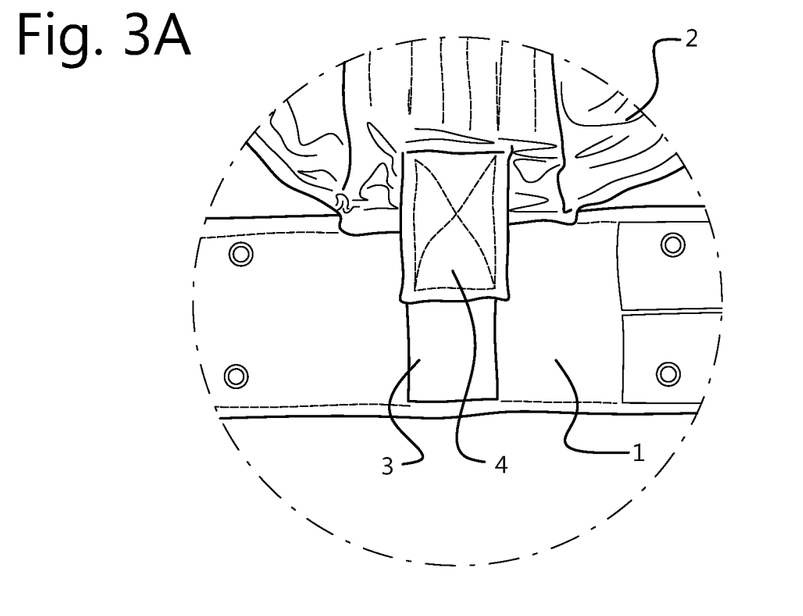
FIGS. 3a and 3b show a top view of the protective head cover indicating the length adjustment mechanism, according to one exemplary embodiment of the invention.
Figure 3B:
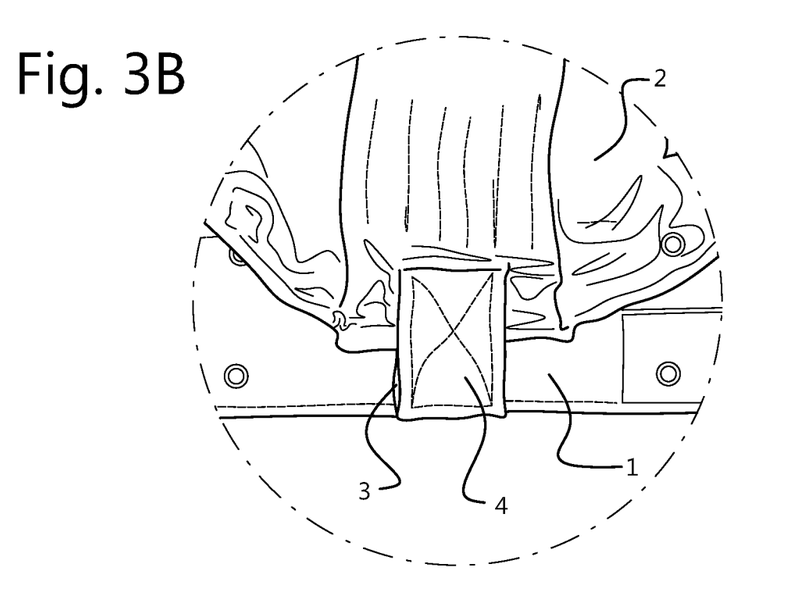
Figure 4:
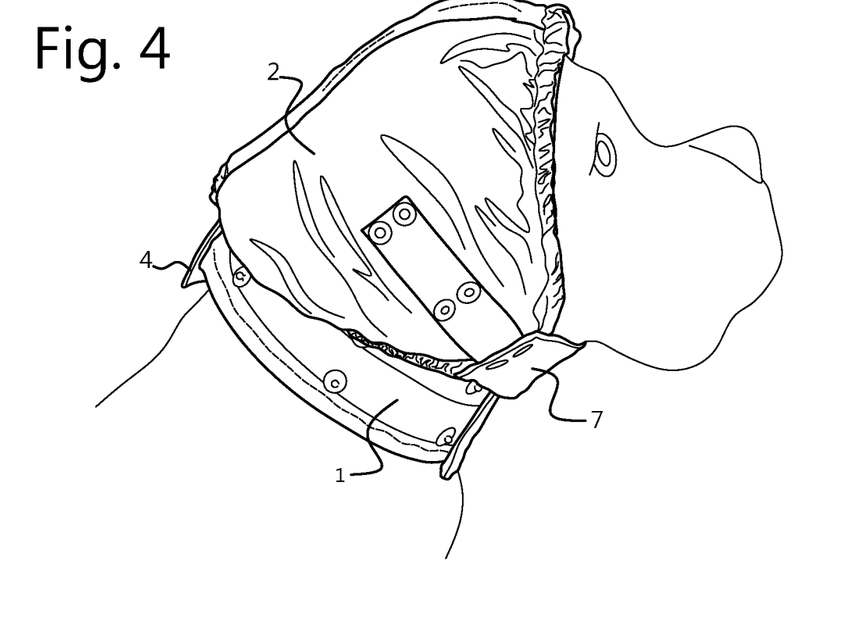
FIG. 4 is a side view of the protective head cover, according to one exemplary embodiment of the invention, wrapped and fastened around the animal near its head/ear/neck.
Figure 5:
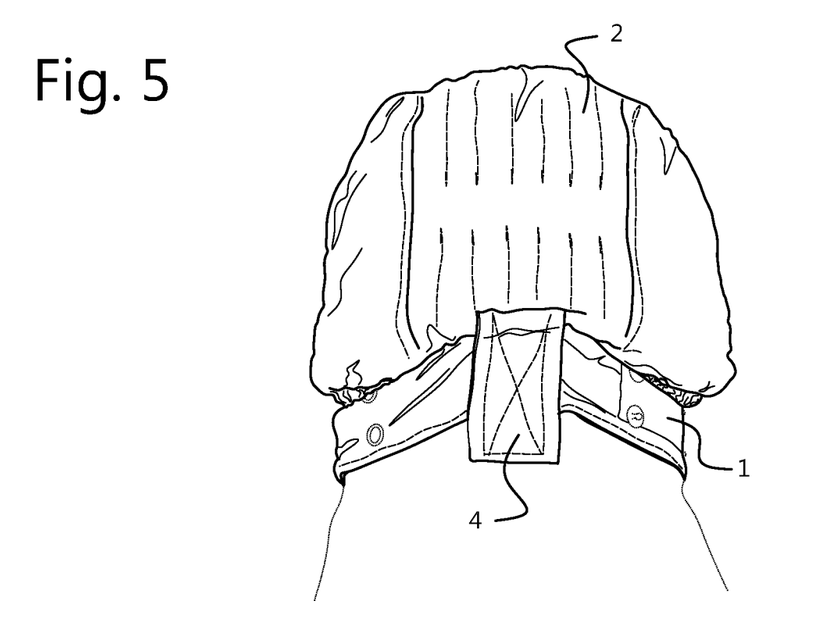
FIG. 5 is a back view of the protective head cover, according to one exemplary embodiment of the invention, wrapped and fastened around the animal near its head/ear/neck. The second fastener part is shown detached to the third fastener part on the inner part of the protective head cover.
Figure 6:
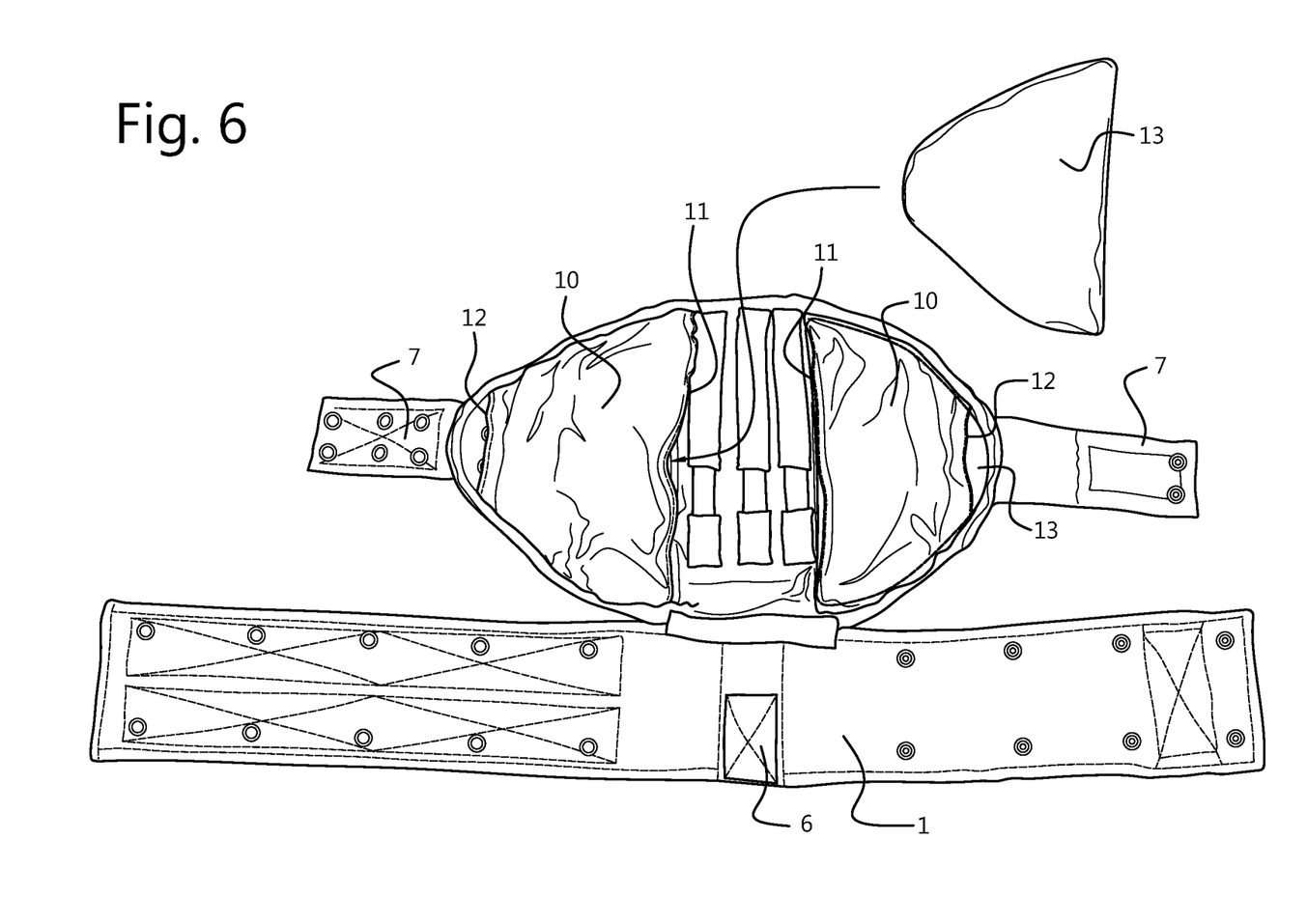
FIG. 6 is a bottom view of protective head cover according to one exemplary embodiment of the invention, and incorporates cavities in the inner part of the second cover portion.

FIG. 1 and FIG. 2 show top and bottom views of the protective head cover, respectively, according to one embodiment of the invention. FIGS. 3a and 3b show a top view of the protective head cover exemplifying the length adjustment mechanism according to one embodiment of the invention. FIGS. 4 and 5 are side and back views of the protective head cover wrapped and fastened around the animal near its head/ear/neck, respectively. In FIG. 5, the second fastener part is shown detached to the third fastener part on the inner part of the protective head cover. FIG. 6 is a bottom view of protective head cover incorporating cavities in the inner part of the second cover portion.

A plurality of elongated cover portions (1, 2) are shown in FIG. 1, one of which is closed curvilinear, and the other, rectangular. Both cover portions may be attached near a tangential or perimetric part (4) of the curved cover portion. An axis (5) may be visualized or drawn perpendicular to the tangential part, and approximately central to the head cover in a fastened or worn position. The lengths of the first or the rectangular cover portion in a direction transverse to the axis (5) may be appropriately chosen according to size requirements.

In an embodiment, the second cover portion (2) comprises curved sections which taper outward from the tangential section that attaches to the first cover portion. The curved sections optimize the overlap between both cover portions so that the neck of the animal is minimally exposed. This enables the head cover to be especially useful as a head muff against the cold. It also provides more effective isolation of the wounded or infected area from animals like insects. When worn by a dog, for example, the second cover portion surrounds the head portion, like the occiput, the ears, and below the chin. The first cover portion (1) surrounds or loops the collar or the neck region of the animal, and overlaps or wraps adjacent to the second cover portion, towards the chest of the animal, in a fastened position.

Both the first and the second cover portions (1, 2) can be fastened adjustably, to ensure the correct fit. FIG. 1 shows both hook and pile, and button fasteners to achieve this purpose. The provision of buttons, according to one embodiment of the invention, prevents the dog from accidentally removing the hook and pile fasteners (for example, Velcro) as they scratch themselves. The buttons may also be used as another fastening mechanism if the Velcro gets damaged over time.

In an embodiment of the invention, fasteners may be provided on a significant area (for example, throughout both sides) of the first cover portion (1), and on both extensions (7) of the second cover portion, as shown in FIG. 1. Fasteners on the extensions (7) may further extend to an outer part near the ear of the animal. This enhances adjustability around the neck and head to a large extent, while ensuring the least discomfort to the animal. For example, neck and head/chin circumferences for an embodiment of the invention may range from 34-50 cm and 40-46 cm, respectively. For yet another embodiment, the values may range from 39-60 cm and 48-62 cm, respectively.

FIG. 1 further shows a first fastener part (3) which is provided on the first cover portion (1), near the tangential section of the second cover portion on axis (5). A corresponding second fastener part (4) is provided on the second cover portion (2), which can be attached to the first fastener part (3). Both fastener parts are provided on the outer part of the head cover. In a wrapped position of the head cover, the first and second fastener parts would be positioned on/near a middle part of the nape of the animal. The first and second fastener parts may be Velcro, however, as mentioned above, are not limited to it.

The first and the second fastener parts (3, 4) may act in combination or independently to adjust the length of the protective head cover. When the second fastener part (4) is moved in a direction away from the tangential section of the second cover portion (2) towards the first cover portion (1), an area of the second cover portion (2) overlaps that of the first cover portion (1). A further pulling action towards the first cover portion (1) creates more spatial overlap between the cover portions.

As the second fastener part (4) completely overlaps the first fastener part (3), as shown in FIG. 3b, the second cover portion (2) coexists with the rectangular (first) cover portion (1) on one of its length sides. This length side does not contact the tangential edge of the second cover portion (2). Further, a part of the second cover portion (2) may be in a folded position on top of the first cover portion (1). The more the pulling action, the more the second cover portion (2) folds itself on the first cover portion (1). This allows a size of the head cover to decrease progressively through the process. In an embodiment of the invention, a difference in length of the head cover to as much as around 5-10 cm from an initial unfolded length L, can be achieved upon maximum overlap between the first and the second fastener parts.

The second fastener part (4) may be pulled down further, as may be seen in FIG. 5 which shows the head cover wrapped and fastened on a dog. A third fastener part (6) is provided on an inside part of the first cover portion (1). This fastener part (6) attaches adjustably to the second fastener part (4), when the latter is folded into the first cover portion (1). Such a provision not only decreases the size of the head cover further, but also prevents discomfort to the dog due to a Velcro strip on its nape. Thus, the animal is protected from any possible abrasion. In an embodiment of the invention, a difference in length of the head cover to as much as around 10-15 cm from the initial length L can be achieved upon maximum overlap between the third and the second fastener parts. The achieved degree of length adjustability allows a single product to be compatible among animals whose neck lengths vary largely. As a combined effect of the adjustability of the first and second cover portions (1, 2), and the first, second and third fastener parts (3, 4, 6), the invention enables a single product to cater to a larger number of dog breeds.

FIG. 2 shows a plurality of pockets (8) on an inside part of the second cover portion (2). A pocket P1 may be attached on axis (5) perpendicular to the tangential section of the second cover portion (2), such that it extends along or across the axis (5). Further pockets P2 and P3 may be attached parallel to the pocket P1, around 0.5-3.5 centimeters apart from the central pocket, preferably around 1-2 cm. A pocket may be rectangular in shape, and around 2-4 cm in width. In case of an even number of pockets, according to an embodiment of the invention, they may be placed minimally spaced from axis (5) and substantially parallel to it. Each pocket may further include a gap which allows insertion and removal of support strips or plates in a simple manner. Both the pockets and the plates are preferably distanced symmetrically apart from each other. Each plate is preferably around 0.5-3.5 cm in width, more preferably, around 1.5-2.5 cm. The number of pockets may be chosen differently in various embodiments. For example, the inside part of the second cover portion in a head cover may comprise 2 pockets or even 1 pocket (and correspondingly plates) for dogs of relatively smaller sizes, and >3 for larger dogs, to balance comfort and support. Similarly, other widths may be selected based on the width of the plates.

The plates stabilize the head cover so that it does not slide back to the nape of the dog or forward towards its eyes. They are made of plastic material, appropriately soft not to harm the animal, and appropriately hard to provide the support and stability. Additionally, their resilience retains the shape and position of the head cover, when worn by the animal. The location of the gaps on the pockets especially make removal of old strips easy for a pet owner, as the strips eventually lose their resilience. In addition, the gaps provide the flexibility to simply insert or remove support, as required for the dog. The provision of support strips on top of the dog's head is preferred to near the ear region, to avoid discomfort to ears, especially after ear surgeries. This is achieved by placing the strips on or near the axis perpendicular to the tangent of the second cover portion, and substantially central to the second cover portion.

In an embodiment of the invention, the inside part of the second cover portion further comprises a plurality of cavities (10), for example, a cavity on each opposite side of the axis (5). This can be seen in FIGS. 2 and 6. The cavities are placed near the dog's ears. Their inclusion inside the head cover provides a means to supplement the head cover with additional inlays. Each cavity preferably comprises two openings, one larger (11) than the other (12). The openings (11) and (12), for example, may be approximately adjacent to pocket P2 (or P3), and a corresponding extension 7, respectively. in one embodiment of the invention. The positioning of the cavities maximally utilizes the area of the second cover potion.

Each cavity is adapted to receive an inlay like a padding (13), preferably via opening (11). The padding may be used as a cushion to the ears of the animal, for example, to ensure maximum protection after surgery. In an embodiment of cushioned padding, any soft material like cotton or soft foam may be used as filling to the padding.

A fastener part (not shown in the figures) is provided on padding (13) on one of its surfaces, and attaches to a corresponding fastener part on a wall of the cavity. Such fastener parts may be hook and pile, or any other suitable type. The fasteners align the inlay in the cavity, as well as retain them in place when worn by the animal. Furthermore, such fastening mechanisms allow padding to be removed and replaced, for example, when it is not required for one or both ears, or when another inlay may be desired. In one embodiment of the invention, the cavity is adapted to receive thermal padding (13). For example, cooling pads may be employed to reduce inflammation to ears, or simply cool the body in hot weather conditions.

Thermal padding may similarly be used to protect the animal from cold weather.

The larger opening may be around 6-12 cm in length, and the smaller opening, around 4-8 cm. The sizes of the openings are selected as sufficiently large to ensure minimal discomfort to the animal. Each cavity further enables an ear of the animal to be inserted via opening (11). The ear is allowed to pass through opening (12). The size of the cavity is optimized to allow the ear to be inserted or passed through the openings with or without the inlay in place. To ensure a stable fit around the forehead, cheeks and the jaw of the animal, an elastic member may be provided along the boundary of the second cover portion (2). The elastic member is sandwiched between the inner and outer part of the second cover portion, preferably stitched or sewn into the head cover.

The outer part of the head cover may be made from cold weather or hot weather fabrics, breathable fabrics, waterproof or water resistant fabrics, soft fabrics, washable fabrics, anti-bacterial fabrics or just trendy fabrics like jeans. The inner part of the head cover is made from soft fabrics, to ensure maximum comfort to the animal. At least those fasteners which are in contact with the animal's body are made from soft material, to minimize adhesion to hairs.

While the invention has been particularly shown and described with reference to a certain exemplary embodiments thereof, it will be understood by those of ordinary skill in the art that various changes in form and detail may be made therein without departing from the scope of the present invention as defined by the appended claims and equivalents thereof.

The invention claimed is:

1. A protective head cover for an animal, the protective head cover comprising:
    a first rectangular cover portion adjustably fastenable around the neck of the animal and a second closed curvilinear cover portion comprising a tangential edge which is attached to a longitudinal side of the first cover portion, and tapering outward sections on either side of the tangential edge, the second cover portion being adjustably fastenable and adapted to cover at least the occiput and ears of the animal;
    a first fastener part located on an outer side of the first cover portion and near the tangential edge of the second cover portion, and a single second fastener part on the second cover portion, the first fastener part being adapted to attach to the single second fastener part,
    wherein the first fastener part and the single second fastener part are located on a first axis located perpendicular to the tangential edge of the second cover portion and central to the head cover between the tapering outward sections in a worn position by the animal,
    wherein the single second fastener part is attached to the second cover portion on a location on the first axis between the tapering outward sections and at a distance from the tangential edge such that a part of the second cover portion is arranged to be disposed in a folding position on top of the first cover portion during a pulling action of the single second fastener part,
    wherein the single second fastener part is a strap configured to be pulled towards the first cover portion, and the first fastener part and the single second fastener part are configured to be adjustably fastened to each other with a variable amount of overlap therebetween to vary spatial overlap between the first and the second cover portions in a direction perpendicular to the tangential edge of the second cover portion, wherein the second cover portion further comprises a first extension which extends radially outward from one of the tapering outward sections and a second extension which extends radially outward from the other one of the tapering outward sections, the first and second extensions being provided with fasteners such that the first and second extensions can be adjustably fastened around the neck of the animal, and wherein the protective head cover further comprises a third fastener part on an inner side of the first cover portion adjustably fastenable to the single second fastener part, wherein the third fastener part is configured to be adjustably attached to the single second fastener part when the single second fastener part is folded into the first cover portion.

2. The protective head cover of claim 1, wherein the first and the single second fastener parts are located on an outer part of the protective head cover.

3. The protective head cover of claim 1, wherein the fastener parts are hook and pile fastener parts.

4. The protective head cover of claim 1, wherein the first and the second cover portions comprise hook and pile, and button fasteners.

5. The protective head cover of claim 1, wherein the second cover portion comprises, in an inner part, a plurality of pockets on or parallel to the first axis, the plurality of pockets being adapted to seat resilient plates and are adapted to allow the resilient plates to be inserted or removed.

6. The protective head cover of claim 1, wherein the second cover portion further comprises, in the inner part, a plurality of cavities, the plurality of cavities being located on opposite sides of the first axis.

7. The protective head cover of claim 6, wherein each of the plurality of cavities comprises a first opening which is larger than a second opening, and each of the plurality of openings is adapted to receive a padding via the first opening.

8. The protective head cover of claim 7, wherein each of the plurality of cavities is further adapted to receive an ear of the animal via the first opening and allow it to extend via the second opening.

9. The protective head cover of claim 7, wherein each of the plurality of cavities comprises a padding and a fastener part adapted to position each padding inside each cavity.

10. The protective head cover of claim 6, wherein each of the plurality of cavities comprises a padding and each padding comprises cushioned padding or thermal padding.

11. The protective head cover of claim 1, wherein at least the fasteners in contact with the animal are made of soft material.

12. The protective head cover of claim 1, wherein the tapering outward sections of the second cover portion are curved, and the second cover portion further comprises a flexible member disposed along a circumference of the second cover potion, and sandwiched between the inner part and the outer part of the second cover portion.

13. The protective head cover of claim 1, wherein, when the protective head cover is worn by the animal, each of the inner part of the first and the second cover portions faces a region near the head of the animal.

* * * * *